(12) United States Patent
Busby et al.

(10) Patent No.: US 9,776,200 B2
(45) Date of Patent: Oct. 3, 2017

(54) SYSTEMS AND METHODS FOR UNMANNED AERIAL PAINTING APPLICATIONS

(71) Applicant: LURYTO, LLC, Reno, NV (US)

(72) Inventors: Luke Andrew Busby, Reno, NV (US); Todd Iverson, Reno, NV (US); Ryan McMaster, Reno, NV (US)

(73) Assignee: LURYTO, LLC, Reno, NV (US)

(*) Notice: Subject to any disclaimer, the term of this patent is extended or adjusted under 35 U.S.C. 154(b) by 0 days.

(21) Appl. No.: 14/491,780

(22) Filed: Sep. 19, 2014

(65) Prior Publication Data

US 2016/0082460 A1    Mar. 24, 2016

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B05B 13/00* | (2006.01) |
| *B05B 9/00* | (2006.01) |
| *B05B 9/04* | (2006.01) |
| *B05B 12/12* | (2006.01) |
| *B64C 27/00* | (2006.01) |

(52) U.S. Cl.
CPC ............ *B05B 13/005* (2013.01); *B05B 9/007* (2013.01); *B05B 9/0403* (2013.01); *B05B 12/122* (2013.01); *B64C 2201/027* (2013.01); *B64C 2201/12* (2013.01); *B64C 2201/146* (2013.01)

(58) Field of Classification Search
CPC ....... B05D 13/005; B64C 39/02; B64C 27/00; A62C 99/00

USPC ........ 244/17.11, 53 R; 340/540; 356/139.03; 427/8; 701/2–3
See application file for complete search history.

(56) References Cited

U.S. PATENT DOCUMENTS

| | | | |
|---|---|---|---|
| 5,552,883 A * | 9/1996 | Busch-Vishniac et al. ......................... | 356/139.03 |
| 2010/0085185 A1* | 4/2010 | Nielsen et al. ............... | 340/540 |
| 2011/0212254 A1* | 9/2011 | Morton .............................. | 427/8 |
| 2013/0134254 A1* | 5/2013 | Moore ........................ | 244/17.11 |
| 2013/0325217 A1* | 12/2013 | Seydoux ................ | A63H 27/12 701/4 |
| 2014/0303814 A1* | 10/2014 | Burema ............... | A01B 79/005 701/3 |
| 2015/0041598 A1* | 2/2015 | Nugent et al. .............. | 244/53 R |

* cited by examiner

*Primary Examiner* — Mahmoud Ismail
(74) *Attorney, Agent, or Firm* — Todd J. Iverson

(57) ABSTRACT

Various embodiments of the present disclosure are directed to an Unmanned Aerial System (UAS) for applying a liquid to a surface. According to various embodiments, the UAS includes an Unmanned Aerial Vehicle (UAV) including flight control mechanisms. The UAV is configured to receive first control signals and to adjust an operational configuration of the flight control mechanisms in response to the first control signals. The UAS further includes a delivery assembly coupled to the UAV, where the delivery assembly is configured to receive second control signals and to apply the liquid to the surface located proximately to the UAV in response to the second control signals. The UAS further includes a control unit coupled to the UAV and the delivery assembly, the control unit configured to transmit the first and second control signals to the UAV and the delivery assembly, respectively.

14 Claims, 14 Drawing Sheets

SYSTEMS AND METHODS FOR UNMANNED AERIAL PAINTING APPLICATIONS

BACKGROUND

Unmanned aerial vehicles (UAVs), or simply drones, have been designed, built, and flown for decades. No longer strictly limited to recreational users, such as radio-controlled model airplane enthusiasts who send miniscule replicas of World War II fighter aircraft airborne, nor to reconnaissance experts working for clandestine arms of the government who construct and build flying platforms that are packed with sensors and electronics and capable of being remotely piloted from a control station a hemisphere away, the use of UAVs is expanding rapidly into commercial applications as well.

Relatively recently, a prominent American businessman envisioned a world where UAVs can deliver consumer items to a customer's doorstep within thirty minutes of being ordered online. While this vision may yet be some years from being realized, UAVs have already been used in applications related to wildfire mapping, disaster management, thermal infrared power line surveys, telecommunications, weather monitoring, aerial imaging/mapping, television news coverage, sporting events, moviemaking, environmental monitoring, and oil and gas exploration. It is safe to say that the growth of Unmanned Aircraft Systems (UAS) that utilize UAVs is expected to grow exponentially. Indeed, global annual spending on research, development, testing, and evaluation of UAS was about 6.6 billion U.S. dollars in 2013 and is expected to grow to 11.4 billion by 2022.

While the growing proliferation of UAS has the potential to transform human life and bring us one step closer to a society straight from a science fiction novel, there are a host of unresolved issues lurking behind this growth, perhaps the biggest one being public safety. For example, since existing UAS are managed remotely and rely upon wireless signals to receive operational commands, a UAS can be hacked and its mission bent to destructive purposes. In 2012, a University of Texas professor and a group of students demonstrated this weakness by intercepting a Global Positioning System (GPS) guided UAS, using a OPS device that they created.

Integrating UAS safely into national airspace also represents a nightmare for the entities responsible for control and safety of the National Aerospace System (NAS). In March of 2014, a National Transportation Safety Board (NTSB) administrative law judge overturned the Federal Aviation Administration's (FAA) first-ever fine against a drone operator, ruling that when the operator flew an unmanned drone over the University of Virginia in 2011, "there was no enforceable FAA rule or FAR (Federal Aviation Regulation) applicable to model aircraft or for classifying model aircraft as an UAS."

The U.S. Congress has asked the FAA to formulate a plan for safe integration of UAS into commerce by the fall of 2015. Meanwhile, the FAA has officially stated on their website that anyone who wants to fly an aircraft—manned or unmanned—in U.S. airspace needs some level of FAA approval. In the regulatory vacuum that currently exists, there is a need for UAS and methods of operating UAS that are both safe to the public and stand a good chance of avoiding the strict regulatory oversight that appears likely to be introduced by the FAA in the near future.

SUMMARY

In accordance with some embodiments of the present disclosure, a painting system is configured to be coupled to a UAV, where the UAV includes flight control mechanisms and is configured to receive first control signals and to adjust an operational configuration of the flight control mechanisms in response to the first control signals. The painting system includes a delivery assembly coupled to the UAV, and is configured to receive second control signals and to apply a liquid to a surface located proximately to the UAV in response to the second control signals. The painting system further includes a control unit communicatively coupled to the UAV and the delivery assembly, where the control unit configured to transmit the first and second control signals to the UAV and the delivery assembly, respectively.

DETAILED DESCRIPTION

Figure 1:
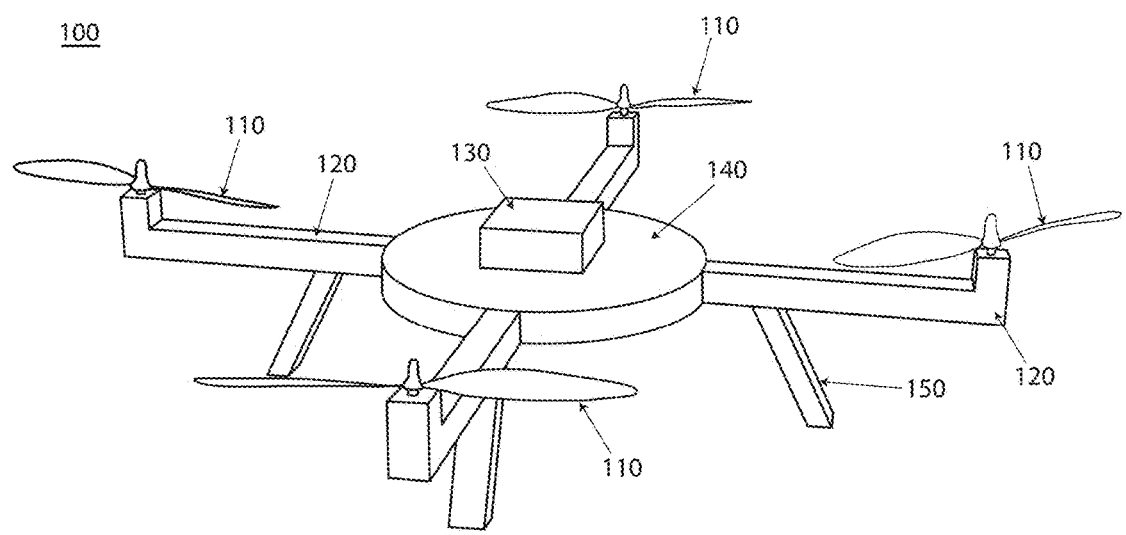
FIG. 1 is a perspective-view diagram illustrating an example UAV suitable for use with embodiments of the present disclosure.

In view of the concerns identified above, it is desirable to develop UAS and methods for performing mundane yet dangerous tasks using UAS that reduce or eliminate dangers to human beings who traditionally perform the same tasks, as well as to bystanders who may be in proximity to the operational UAS. It is also desirable to develop UAS and methods for performing tasks using UAS that are considered safe to the general public by aviation regulatory authorities, and therefore, easily approved. The inventors have recognized that painting applications, especially painting that is performed for the routine maintenance of large structures such as buildings and bridges, is one such area where UAS have not yet been fully exploited, and where UAS can achieve great cost savings while simultaneously reducing or eliminating the danger associated with these tasks.

In the following detailed description, several example embodiments of UAS for painting applications will be described in detail. Those skilled in the art will recognize that the inventive aspects or teachings described in conjunction with this limited selection of embodiments may be combined in a variety of different ways to arrive at embodiments that are not specifically described herein, yet nonetheless exhibit the inventive aspects as taught by this disclosure. As such, the various example embodiments described herein should be considered illustrative only and not limiting in any way, as the specific claims accompanying this disclosure will delineate and define the breadth and scope of the invention.

Furthermore, out of necessity, the following detailed description does not provide an exhaustive description of every detail necessary to build a UAS for painting applications in accordance with embodiments of the present disclosure. Rather, areas where those skilled in the art would be expected to possess a certain threshold level of knowledge are omitted so that the inventive aspects of the example embodiments may be focused upon. It is expected that the knowledge possessed by those of ordinary skill in the art at the time of filing this application, coupled with the inventive teachings found herein, will be sufficient to provide those of ordinary skill the ability to manufacture, program, and use UAS for painting applications as conceived and envisioned by the inventors.

A note on terminology is appropriate at this point. In the following detailed description, the words "including" or "includes" are used in the non-exclusive sense. That is, if a system, component, assembly, etc., is described as including an element A, an element B, and an element C, there may be one or more other, undescribed, elements as well. Similarly, the words "comprising" or "comprises" are also used in this non-exclusive sense.

Throughout the specification, if the inventors wish to impart any particular or specialized meaning to any word or term, this will be clearly signaled in the text by phrases such as "the term _____ refers to . . . ," "the word _____ is defined as . . . ," or other, similar language. In the absence of such an explicit definition, it is expected that the meaning of a word will be apparent based upon its ordinary and customary meaning coupled with whatever context in which it is used. For example, in the following detailed description, when a first element is described as being "coupled" to a second element, this shall indicate that the first element is attached directly to the second element, perhaps with a coupling such as a screw, bracket, rivet, adhesive, etc., without any intervening elements. On the other hand, when a first element is described as being "connected" to a second element, this shall mean that there may be any number of intervening elements attached between the first and second elements.

Next, inventive aspects that are characteristic of embodiments of the present disclosure will be described below with reference to the Figures that were identified above. In general, the first number of a reference number is indicative of the Figure in which the element is first described, i.e., the number "210" begins with the numeral "2," indicating that the element first appeared in FIG. 2 and was first described with reference to FIG. 2. Throughout the following detailed description, like numbers refer to like elements. Finally, the reader is reminded that the Figures accompanying this detailed description are rendered for ease in conveying inventive aspects, and are not necessarily drawn to scale.

System Overview

Some embodiments of the present disclosure provide a UAS that includes a UAV and a paint delivery subsystem connected to the UAV. In these embodiments, an operator of a UAV can remotely direct or pilot a UAV to hover in close proximity to a structure, and control the connected paint delivery subsystem in order to apply paint to the structure in a desired manner. In these embodiments, the skill of the operator controlling the UAV is of importance because the UAV should be maintained at an optimum distance from the structure so that paint may be applied evenly and with minimal dispersion while simultaneously avoiding objects that should not be painted such as windows and doors.

In other embodiments of the present disclosure, a UAS that includes a UAV and a paint delivery subsystem is capable of being automatically controlled by a programmable computer through a software application. In these embodiments, a UAS may include sensors that are capable of determining a precise location of a UAV relative to a structure. A programmable computer may operate a UAV to fly along a predetermined flight path while maintaining a precise position of the UAV relative to the structure by automatically adjusting flight control elements of the UAV in response to changing wind conditions. In these embodiments, a programmable computer, based upon the location information, may also control the paint delivery system attached to the UAV to precisely apply paint to the structure in a desired manner.

In still other embodiments of the present disclosure, a UAS includes a UAV and a paint supply reservoir that is connected to the UAV and configured to remain on the ground while the UAV is in flight. In these embodiments, one or more pumps may be used to deliver paint that is held in the paint supply reservoir to a nozzle that is attached to the UAV. There may be larger, heavier, ground-based pumps that are connected to the paint supply reservoir that perform the task of lifting the paint to the airborne UAV, and a smaller, lighter pump that is carried aloft by the UAV itself and that provides the optimum pressure for delivery of paint from the nozzle. In these embodiments, paint is delivered to the nozzle via an umbilical that may include one or more flexible tubes. In some embodiments, each of the flexible tubes may supply a different color of paint to the nozzle of the UAV. In other embodiments, an umbilical may optionally include a lightweight power cable to supply electrical power to the UAV and/or the attached paint delivery subsystem, although in most cases the power necessary to operate the UAV and/or the paint delivery subsystem can be provided by a battery that is carried aboard the UAV.

In some embodiments of the present disclosure, a UAS for painting applications includes a UAV and a paint bladder that is carried by the UAV while the UAV is in flight. In these embodiments, the UAS includes a smaller, lighter pump carried by the UAV itself that provides the optimum pressure for delivery of paint from the nozzle of the paint delivery subsystem. In these embodiments, a paint bladder may be detachable from the UAV so that empty bladders may be swapped out for full bladders relatively easily. Because the paint bladder and the amount of paint it can store in these embodiments is necessarily limited due to the lifting capacity of the UAV, these embodiments would be ideal for smaller touch-up painting applications where the number of required refills is limited, as the replacement of a paint bladder would typically be performed by a human operator of the UAS. In these embodiments, the tubing that delivers the paint from the paint bladder to the nozzle of the paint delivery subsystem is also preferably detachable from the UAV so that different colored paint may be used without contamination of paint of one color with paint of a different color.

In some embodiments of the present disclosure, a UAS for painting applications includes a control unit that is operable to provide a user interface to an operator of a UAV, and is operable to transmit control signals to the UAV. For example, control signals may include flight control signals for controlling the flight of a UAV, and/or painting control signals for controlling the application of paint via the nozzle of a paint delivery subsystem attached to a UAV.

UAV

Figure 11:
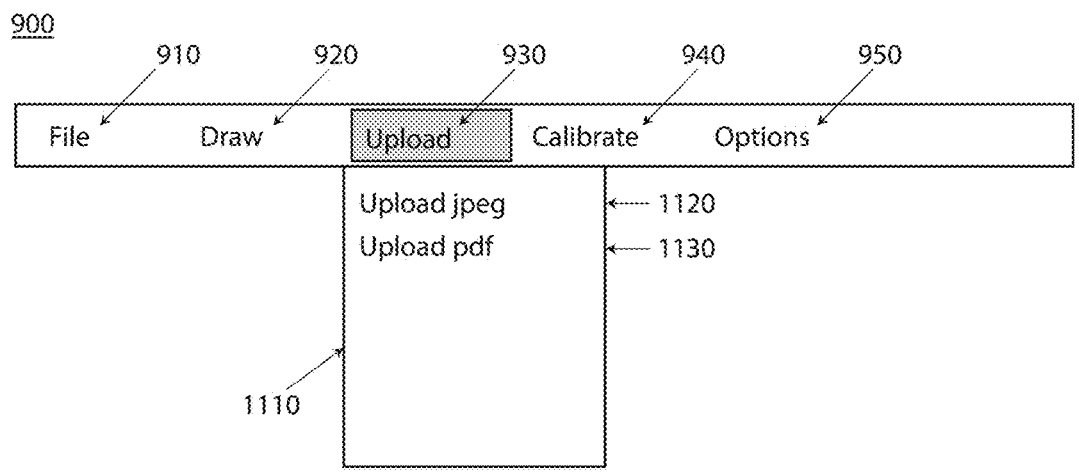
FIG. 11 is a diagram further illustrating aspects of a simplified UI for UAS painting applications in accordance with example embodiments.

FIG. 11 is a perspective-view diagram illustrating a UAV 100 suitable for use in example embodiments of the present disclosure. As envisioned by the inventors, UAS for painting applications utilize UAVs, such as UAV 100, that are capable of hovering and maintaining a fixed position above the ground and in close proximity to buildings and other structures for extended periods of time. As such, UAV 100 is representative of a wide variety of existing UAVs that may be incorporated into UAS for painting applications in accordance with example embodiments.

Referring to FIG. 1, UAV 100 includes a circular body 140, four arms 120 disposed at substantially 90 degree intervals around the circumference of body 140 and extending radially outward from body 140, and four flight control mechanisms or rotors 110. Each rotor 110 is disposed at a distal end of a corresponding arm 120. UAV 100 further includes a controller 130 disposed in a central location on body 140, and four landing struts 150, which are coupled to arms 120 and extend downwardly at an angle from arms 120. Rotors 110 provide lift and steering for UAV 100, giving it the ability to hover in place and maintain a fixed position relative to another object, such as a wall or bridge. An operational configuration of rotors 110 is changed in response to the received flight control signals, and as a result a flight speed, flight direction, and position of UAV 100 may be controlled to a high degree of accuracy. Controller 130 includes a battery (not shown) to provide power to UAV 100 and a wireless receiver (not shown) for receiving wireless flight control signals from a ground-based control station, which will be described in further detail below.

Because UAV 100 has four rotors 110, it is of a type generally known as a "quad-copter" design. Other UAVs suitable for use with other embodiments may have a different number of rotors, such as six rotors ("hexa-copter") or even eight rotors ("octo-copter"). Generally speaking, if the size of the rotors is equal, a UAV with more rotors is capable of producing more lift, but it also requires more energy to power the rotors as well. In the example embodiments of UAS for painting applications that are described herein, a UAV should generate enough lift to enable both itself and whatever payload it may be carrying to become airborne. Weight and lift considerations such as these are normal flight engineering problems that are well-known to those of ordinary skill, and will not be explained in further detail herein.

UAS with Ground-Based Paint Supply

Figure 2:
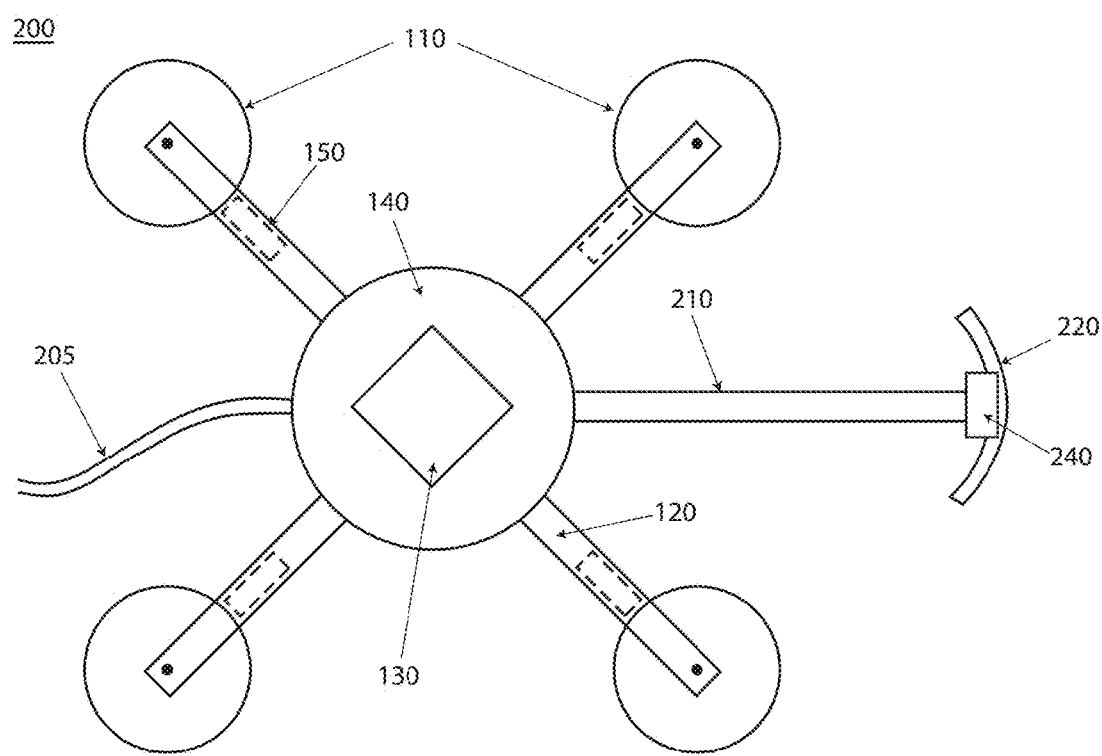
FIG. 2 is a plan-view diagram illustrating a UAV component of a UAS for painting applications in accordance with some embodiments of the present disclosure, where the UAV component includes an attached paint delivery subsystem.
Figure 3:
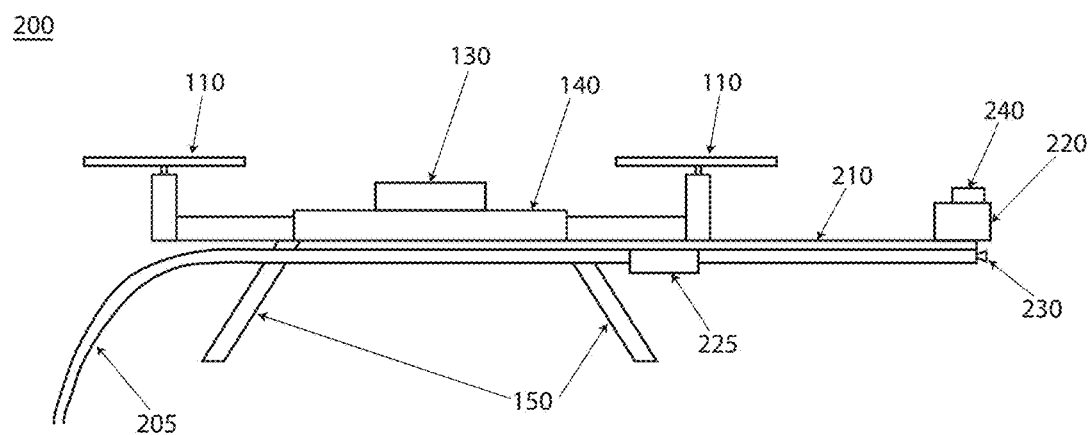
FIG. 3 is a profile-view diagram further illustrating the UAV of FIG. 2.
Figure 4:
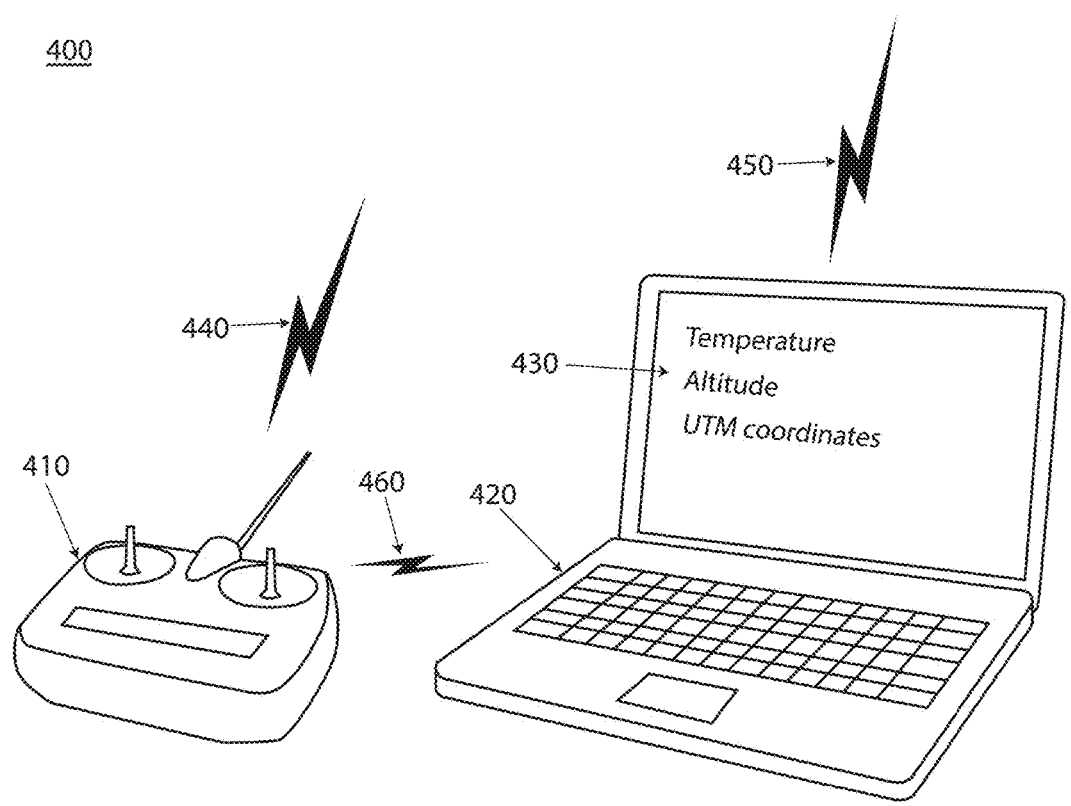
FIG. 4 is a simplified schematic diagram illustrating some components of a remote control station of a UAS in accordance with embodiments of the present disclosure.
Figure 5:
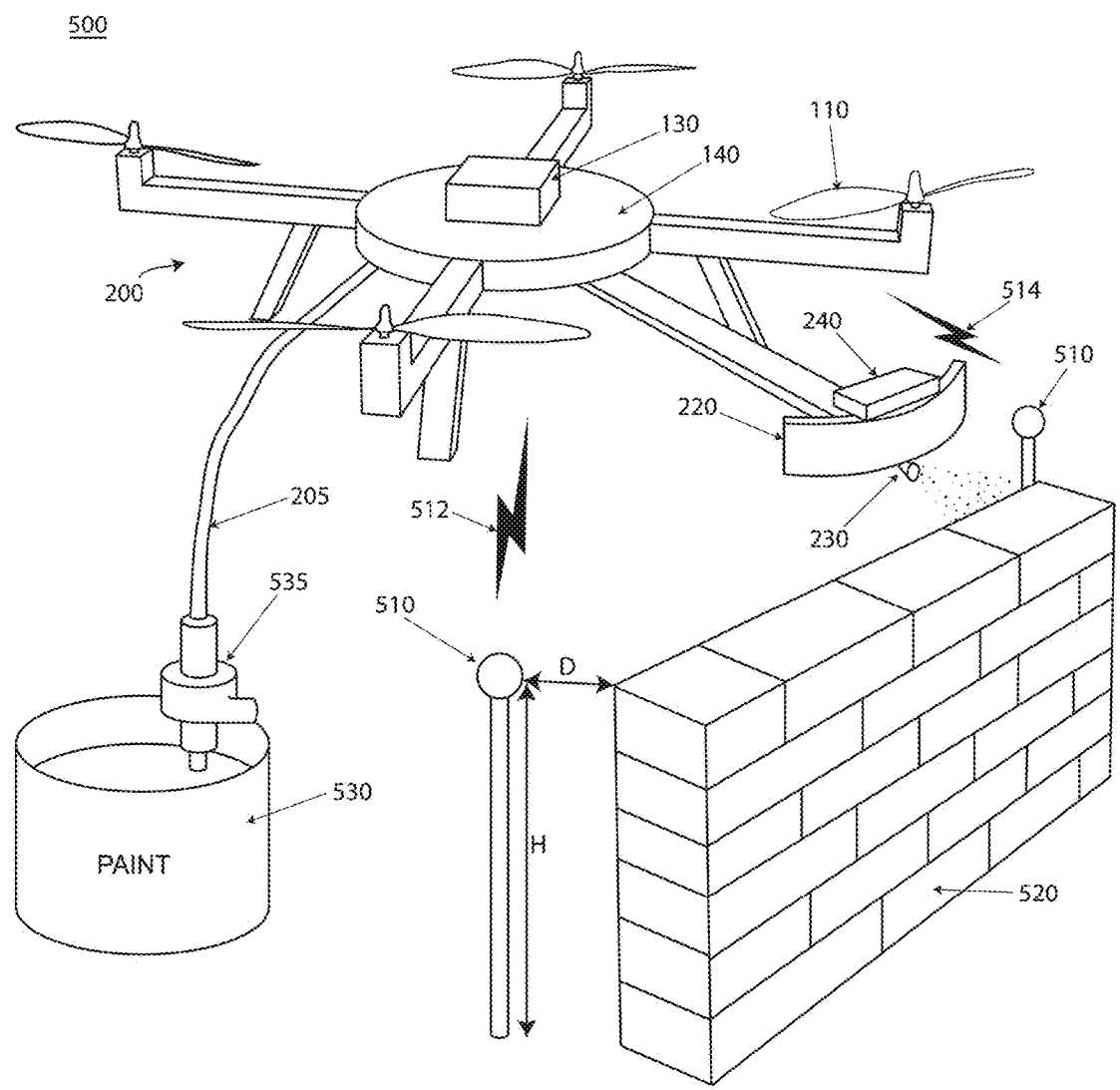
FIG. 5 is a simplified schematic diagram illustrating a UAS for painting applications in a typical idealized operating environment, namely, proximate to a wall that may form part of a house or much larger structure such as an office building or skyscraper.

Collectively, FIGS. 2, 3, 4, and 5 illustrate some important components of a UAS 500 having a ground-based paint supply in accordance with example embodiments, such as UAV 200 (FIGS. 2 and 3), ground station 400 (FIG. 4), and paint supply reservoir 530 (FIG. 5). In particular, FIGS. 2 and 3 are plan-view and profile-view diagrams, respectively, which illustrate a UAV 200 component of UAS 500, where UAV 200 includes an attached paint-delivery subsystem. FIG. 4 is a simplified schematic diagram illustrating a ground control station 400 component of UAS 500. FIG. 5 is a simplified schematic diagram further illustrating UAS 500, as well as showing UAS 500 in a typical idealized operating environment, namely, proximate to a wall 520 that may form part of a house, a shed, or a much larger structure such as an office building or skyscraper.

Referring first to FIGS. 2 and 3, UAV 200 is a "quad-copter" design similar to UAV 100 (FIG. 1), but additionally includes a paint delivery subsystem, which comprises a paint supply line 205, a boom 210, a bumper 220, a pump 225, and a nozzle 230. Additionally, UAV 200 includes a LIght Detection And Ranging (LIDAR) unit 240 disposed above bumper 220 and slightly behind it. Boom 210 extends radially outward from body 140 of UAV 200, preferably at a location that is midway between two of the arms 120. Boom 210 is also preferably longer than a combined radial length of an arm 120 and a rotor 110. Bumper 220 is disposed at a distal end of boom 210, and preferably has a curved shape as shown in the plan view of FIG. 2. Also as shown in FIG. 2, bumper 220 is preferably disposed such that it extends radially outward beyond nozzle 230 and LIDAR unit 240.

Using LIDAR technology, astronomers have been able to measure a distance from the earth to the moon to the nearest millimeter. LIDAR technology is mature and well-known, and further details regarding LIDAR technology will not be reproduced here. Suffice to say, there are numerous designs for LIDAR unit 240 that are suitable for use in UAS 500.

Advantageously, LIDAR unit 240 provides the capability of easily measuring a distance between a surface to be painted and LIDAR unit 240 to a high degree of precision, typically to the nearest centimeter, which is sufficient for most painting applications. Because LIDAR unit 240 will typically be operating no more than 20 or 30 centimeters away from a surface to be painted (contrast this with an earth to moon ranging application of thousands of miles), the power, size, and weight requirements for LIDAR unit 240 are correspondingly low. Thus, UAS 200 is capable of lifting and powering LIDAR unit 240 relatively easily.

In some embodiments, in addition to accurately measuring a distance between LIDAR unit 240 and a surface to be painted, LIDAR unit 240 is capable of distinguishing a nature of the surface itself. For example, based on the reflected returns, LIDAR unit 240 may determine whether a surface is covered with a coating of paint or a coating of rust. Areas where rust is found may be recorded as areas of future concern and/or additional steps may be taken to address the rust problem, such as application of a rust inhibitor, followed by a subsequent application of paint. Alternatively or additionally, LIDAR unit 240 may determine if a surface is bare metal, bare stone, bare wood, etc. This capability is particularly helpful in routine painting applications such as bridge maintenance where periodic spot maintenance may be more cost-effective than completely repainting an entirety of a bridge structure every several years.

In preferred embodiments, and in particular for painting applications where a human operator is flying UAS 200, LIDAR unit 240 and nozzle 230 are disposed relative to each other such that a distance between LIDAR unit 240 and a surface to be painted is the same as the distance between nozzle 230 and the surface to be painted. However, any known offset between a location of LIDAR unit 240 and nozzle 230 may easily be accounted for using software.

In a typical painting scenario, UAV 200 is flown such that nozzle 230 is disposed in close proximity to and aimed towards a surface that is to be painted. That is, UAV 200 is typically flown such that boom 210 substantially forms a right angle between itself and a surface to be painted. In usual situations, a surface to be painted is the closest surface to the UAV 200 and therefore poses the greatest threat to the safe flight envelope of UAV 200. Together, boom 210 and bumper 220 advantageously prevent rotors 110 of UAV 200 from approaching too closely to a surface to be painted. Because bumper 220 extends radially outward past nozzle 230 and LIDAR unit 240, bumper 220 also advantageously prevents nozzle 230 and LIDAR unit 240 from being damaged if bumper 220 contacts the surface to be painted during flight.

Paint supply line 205 is connected to an underside of body 140 and boom 210, and extends radially outward to where it terminates at nozzle 230. Pump 225 is disposed on an underside of boom 210, in line with paint supply line 205, and operates to provide a pre-determined optimum amount of pressure to the paint (or alternatively, any other liquid) that is delivered to nozzle 230. Together, pump 225 and nozzle 230 are controlled by controller 130 to selectively spray the paint carried in the paint supply line 205 onto a surface proximate to nozzle 230. As will be described below with reference to FIG. 5, a supply end of paint supply line 205 may be disposed to draw paint from a ground-based paint supply reservoir 530.

In alternative embodiments, UAV 200 may include more than one boom 210/bumper 220 combination extending radially outward from body 140. While such embodiments with extra booms/bumpers would typically not have an associated paint supply line 205, they would still be beneficial from a safety standpoint, especially in situations where UAV 200 may be expected to be flown proximate to surfaces that are roughly concave in nature, such as an "inner" corner where two walls intersect at a ninety degree angle.

FIG. 4 is a simplified schematic diagram illustrating some components of a remote control station 400 of UAS 500 in accordance with embodiments of the present disclosure. As illustrated, remote control station 400 includes a manual control unit 410 and a laptop computer 420 that is operable to display data 430 to an operator of UAS 500.

Manual control unit 410 is capable of sending signals to UAV 200 or receiving signals from UAV 200 via wireless communication link 440. Laptop computer 420 is capable of sending signals to UAV 200 or receiving signals from UAV 200 via wireless communication link 450. Additionally, manual control unit 410 and laptop computer 420 are capable of exchanging signals via wireless communication link 460. In alternative embodiments, wireless communication link 460 may be replaced with a wired communication link, such as a USB connection, an Ethernet connection, or the like, because manual control unit 410 and laptop computer 420 will typically be positioned in close proximity to the other during operation of UAS 500. In still other example embodiments, functions of manual control unit 410 and laptop computer 420 could be combined into a single, specialized ground control unit.

According to example embodiments, an operator of UAS 500 can use manual control unit 410 to remotely pilot UAV 200 and operate the attached paint delivery subsystem. Alternatively, using laptop computer 420, an operator of UAS 500 can pre-program a flight path and/or a paint application profile using laptop computer 420 and specialized software that includes a user interface, and then simply monitor the progress of UAV 200 as it navigates the flight path and applies the paint to a structure that is to be painted.

Generally speaking, data 430 that is displayed on laptop computer 420 may include any type of information that may be relevant to an operator of UAS 500. For example, data 430 could include location data that is associated with the location of UAV 200, flight data that is associated with the flight profile of UAV 200, environmental data that is associated with the environmental conditions in the immediate proximity of UAV 200 that are relevant to the application of the paint or to the flight conditions, or system status data that is associated with key operational indicators of UAS 500.

As illustrated in FIG. 4, an example of environmental data includes air temperature, but environmental data may also include relative humidity, wind direction, and wind speed. As illustrated in FIG. 4, examples of location data include an altitude of UAV 200 and Universal Transverse Mercator (UTM) coordinates for UAV 200, but location data may also include latitude, longitude, and a distance between bumper 220 and a surface that is to be painted, such as data derived from LIDAR unit 240. An example of flight data may include a visual representation (e.g. a schematic diagram or a map) of a structure (wall, bridge, building, etc.) that is being painted by UAS 500 and a relative position of UAV 200 with respect to the structure. An example of system status data may include an amount of battery life remaining in controller 130, and thus an estimate of how much more time UAV 200 may remain airborne. Other examples of system status data may include error messages, such as whether components of the paint delivery subsystem, such as nozzle 230, are working properly.

Data 430 that is displayed on laptop computer 420 may be collected by appropriate onboard sensors that are included in UAV 200, such as LIDAR unit 240 or other sensors within controller 130, or alternatively may be gathered from other sensors or sources that are not onboard UAV 200. For example, as is well-known, latitude and longitude coordinates are readily calculated based upon Global Positioning System (GPS) signals that are generated by OPS satellites. Instead of being disposed on UAV 200, a GPS receiver may be included in ground control station 400 and still provide roughly the same latitude and longitude information without adding extra weight to UAV 200.

FIG. 5 is a simplified schematic diagram further illustrating UAS 500 for painting applications in a typical idealized operating environment, namely, proximate to a wall 520 that may form part of a house or much larger structure such as an office building or skyscraper. Referring now to FIG. 5, one important consideration associated with UAS for painting applications in accordance with embodiments of the disclosure, such as UAS 500, is the ability to determine an accurate location of UAV 200, and more particularly, nozzle 230, relative to wall 520. To address this concern UAS 500 includes two fixed radio emitters 510 that are disposed at a known height H and a known distance D relative to wall 520. Radio emitters 510 emit a radio signal that controller 130 is capable of receiving via wireless radio links 512 and 514. Using known signal strength comparison techniques, height H, and distance D, controller 130 is capable of determining a position of nozzle 230 relative to wall 520 to the nearest centimeter, which is sufficient for most painting applications.

UAS 500 additionally includes a paint supply reservoir 530 and a pump 535. Paint supply reservoir 530 is operable to hold a supply of paint of a desired color and composition, while pump 535 is operable to force the paint upwards through paint supply line 205, towards UAV 200. Pump 535 provides the majority of the work required to deliver paint to an operational height of UAV 200, while pump 225, which was described above, provides the optimal pressure for the paint that is delivered to nozzle 230.

During operation of UAS 500, UAV 200 operates to apply paint that is delivered to it while in flight by pump 535. Obviously, a maximum operational height of UAV 200 is limited by a length of paint supply line 205. During operation of UAS 500, both paint supply reservoir 530 and pump 535 remain on the ground. In some embodiments, paint supply reservoir 530 may be a small 5 gallon bucket that is transported on a child's wagon. In other embodiments, paint supply reservoir 530 may be part of a large mobile tanker trunk.

Optionally, according to alternative embodiments of the present disclosure, there may be a power supply line bundled or attached to the paint supply line 205, whose function is to provide electrical power to UAV 200 from a ground-based power source. In such embodiments, UAV 200 may have a much smaller on-board battery, or perhaps no battery at all, if power is supplied to it from the ground. In preferred embodiments, however, it would be desirable to have a small battery onboard that is sufficient to return UAV 200 to the ground in a controlled manner if for some reason the power supply line was disconnected or the ground-based power source failed.

It is contemplated that with the precise location-finding capabilities provided by LIDAR unit 240 and radio emitters 510, UAV 200 is capable of autonomously traversing a flight path that allows UAS 500 to consistently apply a uniform coating of paint to selected areas of wall 520. Using laptop 420, operators of UAS 500 may load pre-defined paint profiles for any desired structure. For example, a typical paint profile may include overall dimensions of the structure, and locations and sizes of areas that are not to be painted (windows, doors, vents, etc.) With the appropriate paint profile and precise location information provided by LIDAR unit 240 and radio emitters 510, UAS 500 is capable of precisely, efficiently, and safely applying paint to any and all desired areas of wall 520.

According to some embodiments of the present disclosure, two or more paint profiles can be merged to form a new paint profile. For example, suppose an artist is commissioned to design a mural that will be painted on one side of a 30-story building. Further suppose that there is already a first paint profile for the skyscraper that precisely specifies the surfaces of the skyscraper that can be painted. Using a canvas that has the same relative dimensions as the skyscraper, the artist could conveniently complete the mural on the canvas, take a picture of the canvas, and with the appropriate software package, translate the picture into a second paint profile for the skyscraper. The first and second paint profiles may be merged to form a third, new paint profile that, in its simplest form, specifies where UAS 500 should apply paint, and what color of paint, to the side of the building in order to render an accurate duplication of what the artist completed on the canvas.

According to some example embodiments, laptop computer 430 translates the third paint profile into flight control signals and painting control signals that are transmitted to UAV 200 by ground control station 400. Ground control station 400 is operable to start UAV 200, maneuver UAV 200 to a starting point for the third paint profile, command and control UAV 200 to apply paint in accordance with the third paint profile, and return UAV 200 safely to the ground upon completion of the third paint profile. In this fashion, UAS 500 is capable of saving hundreds of man hours and eliminating dangers associated with people working from great heights.

Safety Advantages of UAS with Ground-Based Paint Supply

From a safety perspective, one particularly advantageous aspect of UAS 500 that was described above, as well as other similar embodiments that utilize a ground-based paint supply reservoir, is the presence of a paint supply line 205 connecting ground-based paint supply reservoir 530 to UAV 200. According to example embodiments, paint supply line 205 not only functions to supply paint to nozzle 230 of UAV 200, it also serves an additional purpose of tethering UAV 200 and limiting its operational area to the vicinity of a structure that is being painted. According to example embodiments of the present disclosure, a paint supply line may additionally include strong and lightweight rope, cable, or similar material that is capable of preventing UAV 200 from breaking free of ground-based paint supply reservoir 530. Thus, even in the event of a malfunction of the UAV or active control of the UAV being lost due to hackers, the operational area of the UAV is limited to a hemispherical volume defined by a length of a paint supply line 205 and the location where paint supply line 205 is fixed in place, eliminating the threat that a runaway or malfunctioning UAV might cause to other manned aircraft in the area.

As was mentioned above, there are currently no FARs in place that regulate the operation of UAS, and at the time of this writing one can only guess as to what final form any of the FAA's future proposals will take. Regardless, example embodiments according to the present disclosure that include a tether in the form of a paint supply line will likely be considered safe by the FAA for several reasons, and therefore requiring of less scrutiny and regulatory oversight.

For example, there is an existing FAR, 14 C.F.R. §101, which regulates the operation of moored balloons, kites, amateur rockets and unmanned free balloons. Moored balloons are those that are attached to the surface of the earth or an object thereon and that have a diameter of more than 6 feet or a gas capacity of more than 115 cubic feet. 14 C.F.R. §101.1(a)(1). Kites are defined as weighing more than five pounds and intended to be flown at the end of a rope or cable. 14 C.F.R. §101.1(a)(2). Under 14 C.F.R. §101.1(b), a gyro-glider (a manned aircraft with unpowered rotors that is designed to be towed by a boat or an automobile) is considered to be a kite.

UAVs attached to ground-based paint supplies by paint supply lines in accordance with embodiments of the present disclosure may be substantially smaller in size than the moored balloons defined by 14 C.F.R. §101, and may be substantially smaller or comparable in weight to the gyroglider or kites defined by 14 C.F.R. §101. 14 C.F.R. §101.7 (a) generally prohibits any person from operating a moored balloon or kite in a manner that creates a hazard to other persons or their property. Thus, because a tethered UAS for painting application in accordance with example embodiments is both smaller in size than a moored balloon and lighter or roughly equal in weight to a kite under existing FARs, it is highly likely that operations of such tethered UAS may be granted a blanket approval conditioned upon operation of the tethered UAV in a non-hazardous manner.

Furthermore, 14 C.F.R. §101.13(a) provides that no person may operate a moored balloon or kite less than 500 feet from the base of any cloud, more than 500 feet above the surface of the earth, from an area where ground visibility is less than three miles, or within five miles of the boundary of any airport. However, 14 C.F.R. §101.13(b) carves out an exception to these operational prohibitions and explicitly states that the rules of paragraph (a) do not apply to the operation of a moored balloon or kite operating below the top of any structure and within 250 feet of it, as long as such shielded operation does not obscure any lighting on the structure itself.

Thus, since tethered UAS for painting applications in accordance with embodiments of the present disclosure will practically always be operated below the height of a structure to be painted and well within 250 feet of a structure to be painted, it is likely that these embodiments would not be considered overly dangerous by the FAA due to the UAVs being shielded from other commercial aircraft by the proximity of the structure that they are painting. If these embodiments are not of a great concern to the FAA because of their tethered operation, then the regulatory hurdles that must be followed for operational approval are likely to be fewer in number, and also relatively easy to obtain. Thus, these safety advantages of the disclosed embodiments may potentially equate to a great convenience and savings in both cost and time to operators of UAS for painting applications as well as other applications where UAVs are operated close to structures that shield passenger aircraft and other manned aircraft from the UAVs.

UAS with Airborne Paint Supply

Figure 6:
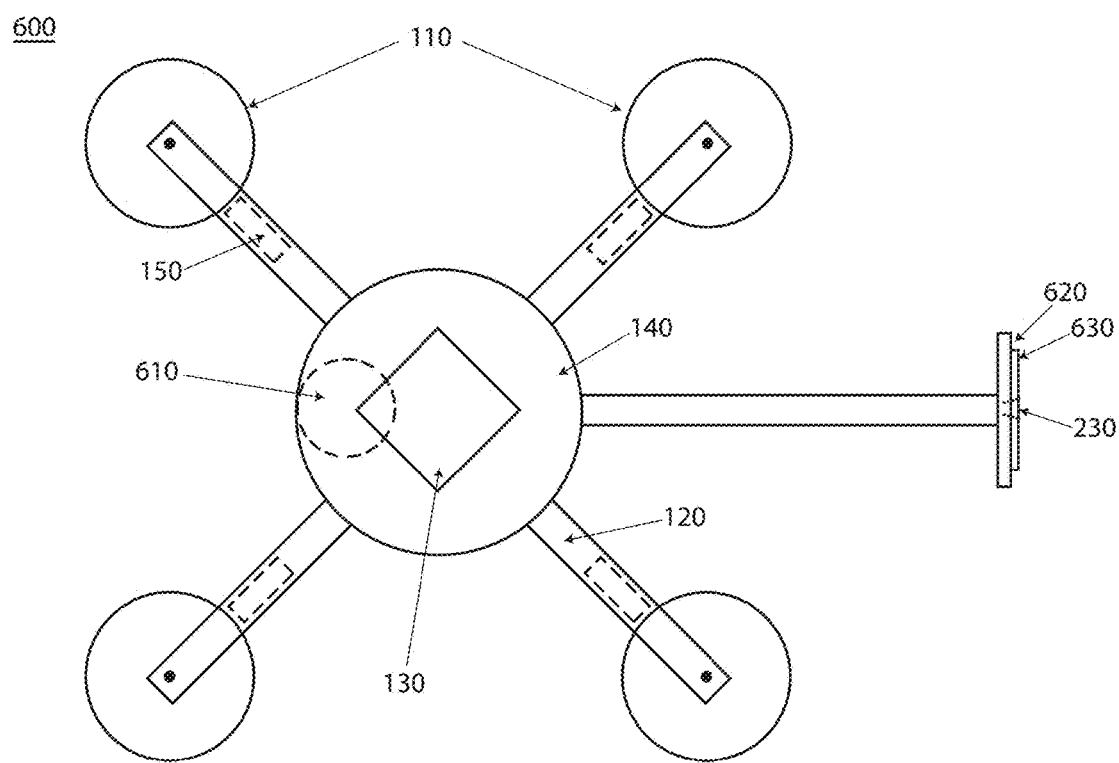
FIG. 6 is a plan-view diagram illustrating a UAV component of a UAS for painting applications in accordance with other embodiments of the present disclosure, where the UAV component includes an attached paint delivery subsystem.
Figure 7:
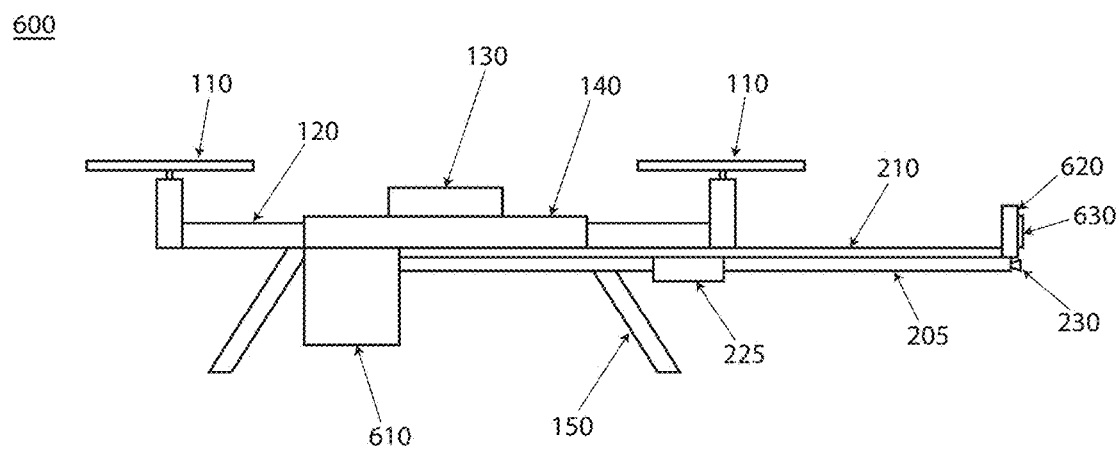
FIG. 7 is a profile-view diagram further illustrating the UAV of FIG. 6.
Figure 8:
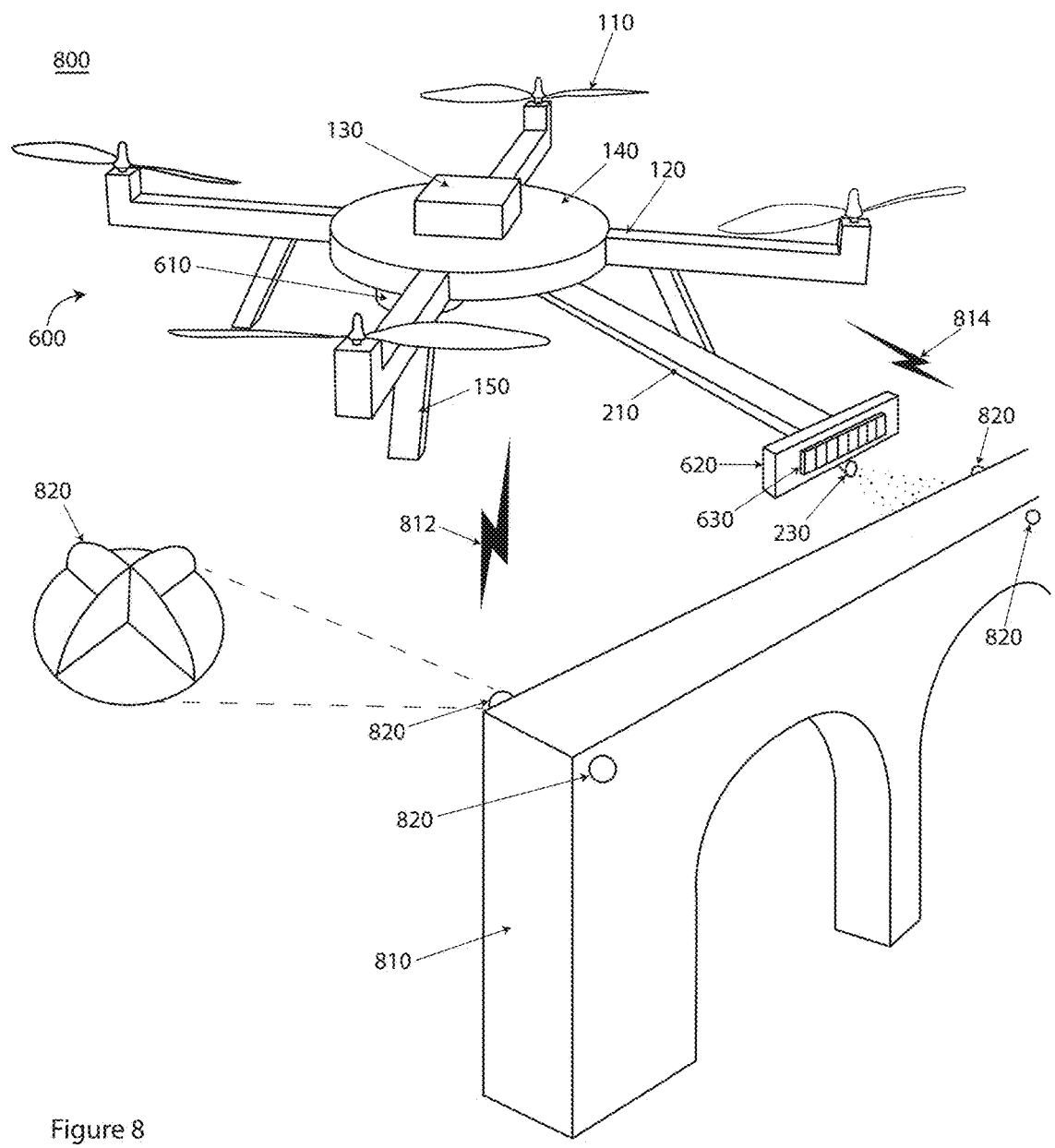
FIG. 8 is a simplified schematic diagram illustrating a UAS for painting applications in another typical idealized operating environment, namely, proximate to a bridge.

Collectively, FIGS. 4, 6, 7, and 8 illustrate some important components of a UAS 800 having an airborne paint supply in accordance with example embodiments, such as ground control station 400 (FIG. 4) and UAV 600 (FIGS. 6 and 7). In particular, FIGS. 6 and 7 are plan-view and profile-view diagrams, respectively, which illustrate a UAV 600 component of UAS 800, where UAV 600 includes an attached paint-delivery subsystem according to other embodiments of the present disclosure. FIG. 8 is a simplified schematic diagram further illustrating UAS 800, as well as showing UAS 800 in a typical idealized operating environment, namely, proximate to a bridge 810.

UAS 800 shares many of the same components as UAS 500 that was described above, such as ground control station 400. Accordingly, where common components have already been described with reference to UAS 500, a duplicative description will be avoided in favor of concentrating on the elements where UAS 800 differs from UAS 500.

Referring to FIGS. 6, 7, and 8, the most obvious difference between UAS 500 and UAS 800 is that UAS 800 includes a paint supply canister 610 that may be detachably affixed to body 140 of UAV 600. The holding capacity of paint supply canister 610 is much less than that of paint supply reservoir 530, and embodiments such as UAS 800 would be more suitable for applications where smaller structures are to be painted, or where basic touch-up painting is all that is required. It is contemplated that in other example embodiments, paint supply canister 610 may have substantially the same form, fit, and function as a typical aerosol spray paint can. According to example embodiments, when paint supply canister 610 is empty, an operator of UAS 800 may swap it with a different paint supply canister 610 relatively easily using a quick-disconnect (not shown) disposed between paint supply canister 610 and paint supply line 205.

Another notable difference between UAS 800 and UAS 500 is that bumper 620, which is disposed at a distal end of boom 210, is substantially flat. Additionally, rather than LIDAR unit 240, UAS 800 includes a CCD camera array 630 that is mounted to a front surface of bumper 620. In some embodiments, CCD camera array 630 may be inset relative to a front surface of bumper 620 so that bumper 620 provides protection to CCD camera array 630. According to example embodiments, CCD camera array 630 is operable to collect image data from immediately in front of bumper 620. This image data is collected by controller 130 and transmitted to ground station 400 via wireless link 450, where the image data may be displayed on laptop computer 430. In this manner, an operator of UAS 800, who is manually flying UAV 600, may visually ascertain how close nozzle 230 is to bridge 810, as well as visually inspect surfaces of bridge 810 for signs of rust or other damage.

Instead of using radio emitters 510 to determine accurate position information, UAS 800 includes a number of reflectors 820 that are affixed to different places on bridge 820 at known positions. Reflectors 820 are preferably metallic, and are known as corner-cube reflectors, because the surfaces of reflectors 820 form 90 degree corners, which have the property of reflecting any incident energy away from the reflectors 820 at substantially the same angle. By periodically transmitting radio or optical energy using wireless links 812 and 814, and measuring the reflected returns, controller 130 may determine the precise location of UAV 600 relative to bridge 810.

Unlike UAS 500, UAS 800 does not possess a paint supply line 205 and the corresponding functionality and safety advantages associated with it that were described above. However, according to alternative embodiments of the present disclosure, a simple tether composed of lightweight cable or rope may be included in order to achieve the same safety advantages as paint supply line 205 of UAS 500.

User Interface (UI) for Ground Control Station of UAS

As was illustrated in FIG. 4, a ground control station 400 suitable for use with example embodiments may include a laptop computer 420. Laptop computer 420 is operable to accept inputs from a human operator of UAS 500 or UAS 800, and translate those inputs into flight control signals and/or painting control signals that are transmitted to UAV 200 or UAV 600. A variety of different software programs may be stored in a memory of laptop computer 420, that when executed by laptop computer 420, provide human operators of UAS 500 or UAS 800 with a User Interface (UI) through which flight path and paint control selections can be accomplished. In general, inputs from human operators of UAS 500 or UAS 800 can be accomplished using the keyboard and/or mouse hardware functionality provided by laptop computer 420. Typically, a UI provides flight control options and paint control options by allowing a human operator to select from different items on a drop-down menu, specify particular numerical values using the keyboard, or the like.

Collectively, FIGS. 9 through 13 illustrate portions of a simplified example UI 900 for painting applications suitable for use with UAS 500 or UAS 800. In particular, FIGS. 9-13 illustrate a variety of example drop-down menus, each menu having a number of example menu items or selections that are intended to demonstrate the sheer variety of options that are possible for painting applications and that are limited only by human creativity. For purposes of this disclosure, an example UI that is implemented using a laptop computer and drop-down menus was selected for illustrative purposes only, other UIs suitable for use with example embodiments could be, for example, implemented with other mobile devices such as a tablet computer, a smart phone, Google Glass® or the like.

Figure 9:
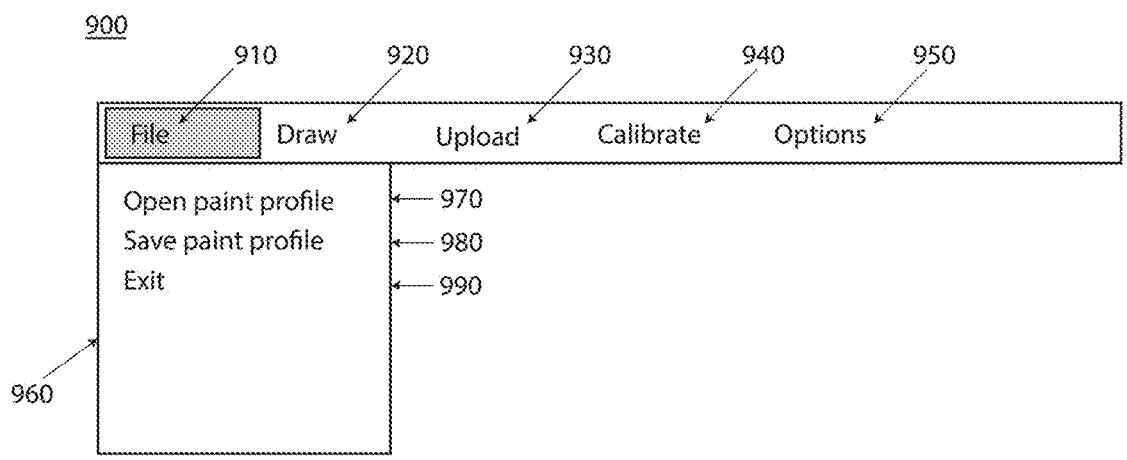
FIG. 9 is a diagram illustrating aspects of a simplified User Interface (UI) for UAS painting applications in accordance with example embodiments.

FIG. 9 is a diagram illustrating a simplified UI 900 for UAS painting applications in accordance with example embodiments. UI 900 includes a number of dropdown menus, such as File menu 910, Draw menu 920, Upload menu 930, Calibrate menu 940, and Options menu 950. As illustrated in FIG. 9, when File menu 910 is selected, a drop-down box 960 appears. Drop-down box 960 includes a number of operator-selectable items such as Open paint profile 970, Save paint profile 980, and Exit 990. The items found in File menu 910 allow an operator of UAS 500 or UAS 800 to open or view an existing paint profile (Open paint profile 970), save changes that are made to a paint profile (Save paint profile 980), or to exit the UI 900 (Exit 990).

In accordance with example embodiments, paint profiles are data files that define the shape, size, and color(s) of a desired painting on an intended structure to be painted. For every desired painting on an intended structure, there are myriad possible flight paths that could be traversed by a UAV component of a UAS painting system relative to the intended structure in order to complete the paint profile. In accordance with some embodiments, the particular flight path associated with a particular paint profile is selected based upon which flight path results in the least power consumption by UAV component. In other embodiments, the particular flight path associated with a particular paint profile is selected based upon which flight path results in the fastest completion of the paint profile. Depending on the paint profile, the most efficient flight path doesn't necessarily result in the fastest completion of the paint profile. In the embodiment of UI 900, the ability to select between these two alternatives is not illustrated but rather one or the other is automatically calculated for every paint profile. Thus, UI 900 is particularly easy for human operators of UAS 500 or UAS 800 to comprehend and utilize, as flight control signals for controlling UAV 200 or UAV 600 are calculated behind the scenes by a processor of laptop computer 420 under control of program software, based upon the desired paint profile, and transmitted to UAV 200 or UAV 600 without active operator involvement.

Figure 10:
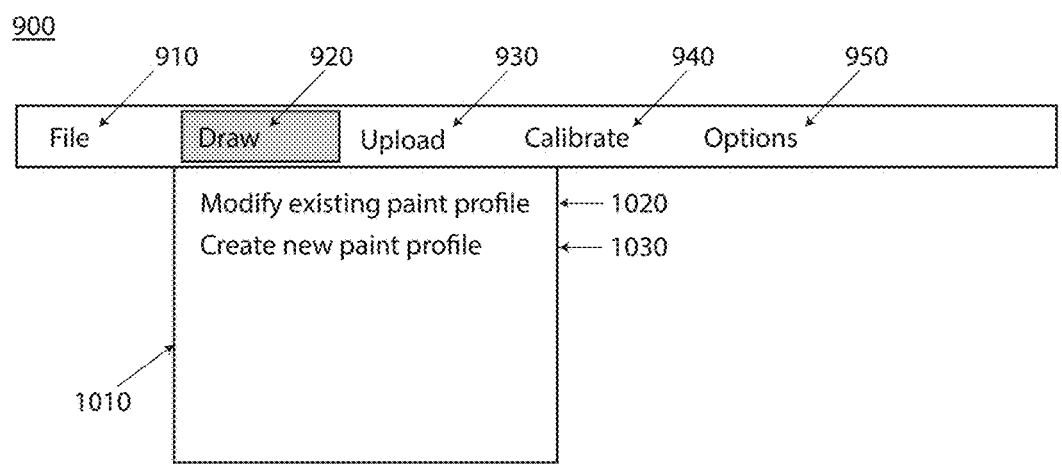
FIG. 10 is a diagram further illustrating aspects of a simplified UI for UAS painting applications in accordance with example embodiments.

FIG. 10 is a diagram further illustrating a simplified UI 900 for UAS painting applications in accordance with example embodiments. In particular, FIG. 10 illustrates in further detail Draw menu 920. When Draw menu 920 is selected, drop-down box 1010 appears. Drop-down box 1010 includes a number of operator-selectable items such as Modify existing paint profile 1020 and Create new paint profile 1030. By selecting the Modify existing paint profile 1020 option, a human operator can make changes to an existing paint profile, for example, change the paint color selection from Olive Drab green to Battleship Grey.

By selecting the Create new paint profile 1030, a human operator may create a new paint profile completely by scratch, specifying colors, shapes, and sizes of a new painting. As was described above, a new paint profile may be created by merging two or more existing paint profiles. According to some example embodiments, paint profiles may be created using a drawing application for a tablet computer, resulting in pictures that are automatically scaled to the dimensions of the surface to be painted. According to some example embodiments, paint profiles may be created from existing photographs or drawings, such as data files in the .jpeg or .pdf format.

FIG. 11 is a diagram further illustrating a simplified UI 900 for UAS painting applications in accordance with example embodiments. In particular, FIG. 11 illustrates in further detail Upload menu 930. When Upload menu 930 is selected, drop-down box 1110 appears. Drop-down box 1110 includes a number of operator-selectable items such as Upload jpeg 1120 and Upload pdf 1130. As was indicated above in the discussion of FIG. 10, UI 900 allows an operator to create new paint profiles using data files in .jpg or .pdf format. Thus, when Upload jpeg 1120 or Upload pdf 1130 is selected, further selection mechanisms are offered to the operator so that she may choose the desired file from which to create new paint profiles.

Figure 12:
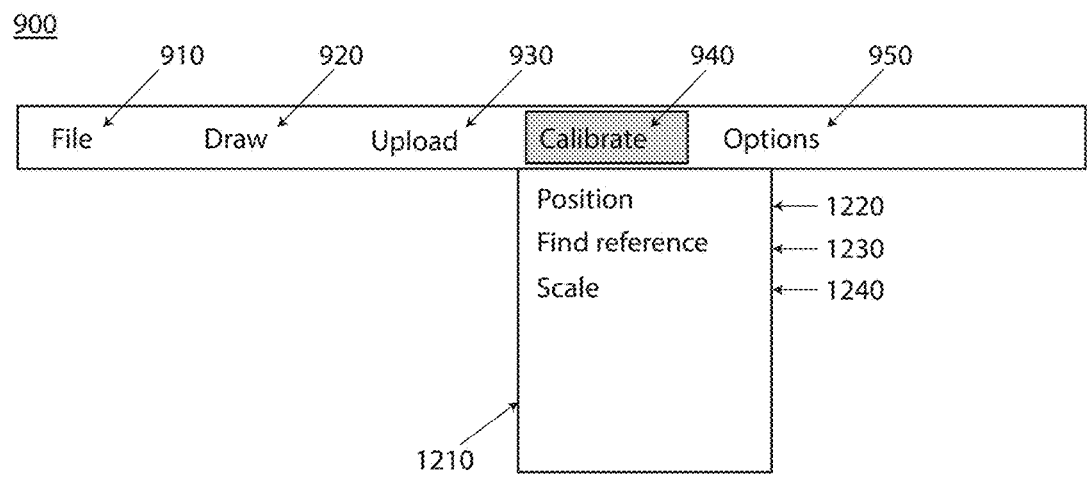
FIG. 12 is diagram further illustrating aspects of a simplified UI for UAS painting applications in accordance with example embodiments.

FIG. 12 is a diagram further illustrating a simplified UI 900 for UAS painting applications in accordance with example embodiments. In particular, FIG. 12 illustrates in further detail Calibrate menu 940. When Calibrate menu 940 is selected, drop-down box 1210 appears. Drop-down box 1210 includes a number of operator-selectable items such as Position 1220, Find reference 1230, and Scale 1240. When Position 1220 is selected, UAS may use onboard sensors as was described above to orient itself at a pre-determined starting point relative to a building or other structure in preparation for completing a selected paint profile. When Find reference 1230 is selected, a UAS may be commanded to maneuver to a specified reference point on a building or structure and resume completing a selected paint profile from that specified reference point. When Scale 240 is selected, a UAS for painting applications may use onboard sensors of the type described above to use an existing paint profile that is sized for a different building and scale it appropriately so that it may be used on a structure having different dimensions.

Figure 13:
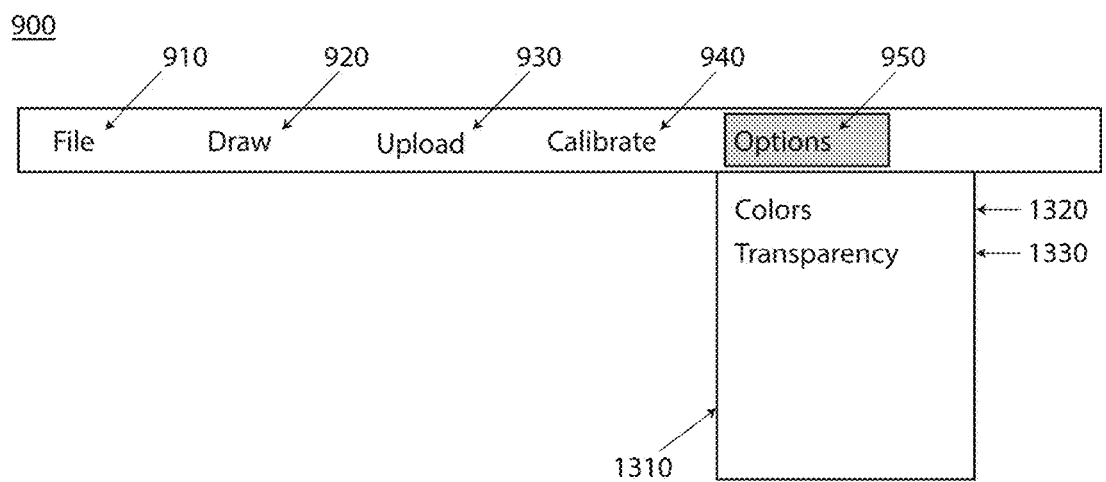
FIG. 13 is a diagram further illustrating aspects of a simplified UI for UAS painting application in accordance with example embodiments.

FIG. 13 is a diagram further illustrating a simplified UI 900 for UAS painting applications in accordance with example embodiments. In particular, FIG. 13 illustrates in further detail Options menu 950. When Options menu 950 is selected, drop-down box 1310 appears. Drop-down box 1310 includes a number of operator-selectable items such as Colors 1320 and Transparency 1330. By selecting Colors 1320, a further list of paint colors is presented to the operator, which the operator may use to specify or change particular paint colors in selected paint profiles. By selecting Transparency 1330, one or more selected paint profiles may be displayed in overlay fashion on a display screen of laptop 420, giving the operator an idea of what a conglomeration of several different paint profiles will look like after being painted on a desired structure.

Methods of Operating UAS for Painting Applications

Figure 14:
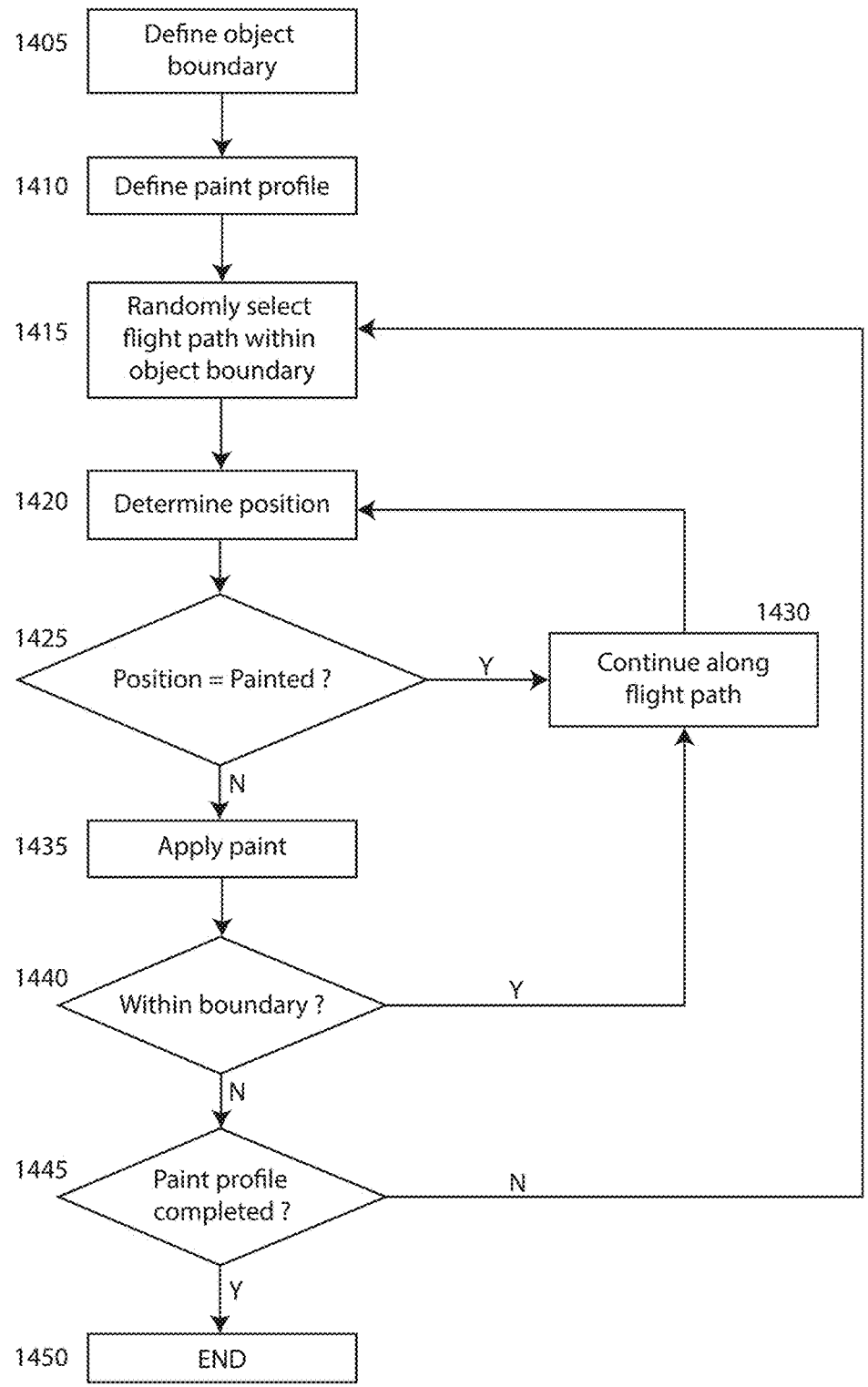
FIG. 14 is a flow-chart illustrating a method of painting a structure with a UAS for painting applications in accordance with some embodiments of the present disclosure.

FIG. 14 is a flow-chart illustrating some processes in a method 1400 of operating a UAS for painting applications in accordance with some embodiments of the present disclosure. As was indicated above, in some embodiments laptop computer 420 is capable of calculating a flight path for a UAV component of a UAS based upon a desired paint profile. In some embodiments the associated flight path is determined based upon efficiency, i.e., the flight path that requires the UAV component to consume the least amount of power. In other embodiments, the associated flight path for a particular paint profile is determined based upon speed, i.e., the flight path that completes the paint profile in the least amount of time.

Speed and efficiency are not the only possible selection criteria for a suitable flight path, however. The inventors contemplate that there is also a significant amount of entertainment that can be derived by the mere act of watching a UAV begin to paint a picture on a surface of a large structure and attempting to guess what the final picture will be. FIG. 14 illustrates a method 1400 that is aimed at doing just that, by randomly selecting flight paths that UAV utilizes the paint the desired paint profile. Randomly selecting flight paths is neither a speedy or efficient way of completing a paint profile, but in some situations the entertainment value it provides could be a worthwhile goal. For example, community interest in public works would be heightened if fund-raisers utilized contests that awarded prizes to the first person who correctly guessed what famous picture or photograph a UAV was painting on the side of a building.

Referring to FIG. 14, method 1400 begins with process 1405, where a boundary of an object is defined and specified. Next, in process 1410, a paint profile is defined. As was indicated above, both of these tasks can be accomplished using paint profiles. One profile may be used to specify the dimensions of an object to be painted, and indicate areas where no paint is to be applied. A second paint profile may be used to specify the size, shape, and color of a painting that is to be placed on the object to be painted. By merging these two paint profiles in accordance with example embodiments, the resulting paint profile specifies exactly where the UAV component of the UAS should apply paint, and the color of paint to be applied.

Next, in process 1415, UAS orients UAV relative to the object (e.g., building) to be painted and randomly selects a direction within the object boundary in which to fly the UAV. As UAV is flown along the randomly selected flight path, UAS periodically calculates a position of UAV within the boundary, in accordance with process 1420. After the position determination of process 1420, UAS reaches decision process 1425, where it determines if the position has been passed over previously (and therefore, already painted).

UAS is capable of storing a record of locations which have been painted, and if a position of the UAV is at a location which should be painted (in accordance with the paint profile) and it has already been painted by the UAV, then UAV is commanded to continue along the randomly selected flight path (process 1430), where it returns to process 1420 where the next position along the randomly selected flight path is calculated. On the other hand, if UAV is at a location that should be painted and the location has not yet been painted, then UAS commands UAV to apply paint at the current position as indicated at process 1435.

After paint has been applied at process 1435, UAS determines whether UAV is still within the defined boundary of the object to be painted at process 1440. If UAV is still within the object boundary, it continues along its flight path (process 1430) and then calculates its new position at process 1420. However, if UAV is no longer within the boundary of the object, UAS proceeds to decision process 1445, where it is determined if the entire paint profile has been completed. If so, then method 1400 ends at process 1450. If not, the UAS commands UAV to return to process 1415, where another flight path within the object boundary is randomly selected, and the UAV changes direction and proceeds along this new direction.

From the viewpoint of an observer watching a UAS applying paint in accordance with method 1400, it would appear as if a UAV component of the UAS was haphazardly following random flight paths along the side of the structure, periodically applying paint in a seemingly careless fashion, yet over time and as more passes are made by the UAV across the boundary of the object, the details of the painting or mural would gradually begin to emerge.

Various changes and modifications to the embodiments of the present disclosure described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An Unmanned Aerial System (UAS) for applying a liquid to a surface, the UAS comprising:
   an Unmanned Aerial Vehicle (UAV) including a body, flight control mechanisms connected to the body, a boom extending radially outward from the body, and a bumper disposed on a distal end of the boom, the UAV configured to receive first control signals and to adjust an operational configuration of the flight control mechanisms in response to the first control signals;
   a delivery assembly connected to the UAV, the delivery assembly configured to receive second control signals and to apply the liquid to the surface in response to the second control signals, the delivery assembly including:
      a supply reservoir, the supply reservoir configured to hold the liquid and remain on the ground while the UAV is in flight,
      a nozzle disposed on the distal end of the boom, the nozzle configured to apply the liquid to the surface, wherein the bumper is arranged to protect the nozzle if the bumper contacts the surface during flight,
      a first pump coupled to the UAV, the first pump configured to supply the liquid to the nozzle,
      a tether comprising a flexible tube connected between the supply reservoir and the first pump,
      a second pump connected to the supply reservoir and the flexible tube, the second pump configured to force the liquid from the supply reservoir, through the flexible tube, and to the first pump; and
   a control unit connected to the UAV, the control unit configured to transmit the first and second control signals to the UAV and the delivery assembly, respectively.

2. The UAS of claim 1, further comprising a ground-based control station, the ground-based control station comprising one selected from the group consisting of a laptop computer, a tablet, and a mobile phone.

3. The UAS of claim 1, the tether further comprising a power supply line.

4. The UAS of claim 3, further comprising a power supply configured to provide electrical power to the UAV and the delivery assembly via the power supply line.

5. The UAS of claim 1, wherein the UAV comprises a plurality of sensors, and wherein the system further comprises a plurality of reflectors affixed to the surface, wherein the sensors are configured to detect a position of the UAV relative to the reflectors and generate third signals associated with the position.

6. The UAS of claim 5, wherein the control unit is configured to determine the location of the UAV relative to the reflectors based at least in part on the third signals.

7. The UAS of claim 6, wherein the control unit is configured to fly the UAV along a predetermined flight path proximate to the surface to apply the liquid in a predetermined pattern.

8. The UAS of claim 6, wherein the control unit is configured to fly the UAV in a plurality of randomly determined directions proximate to the surface and to apply the liquid at predetermined positions along the randomly determined directions, such that over time the liquid is applied to the surface in a predetermined pattern.

9. The UAS of claim 1, the tether further comprising a magnetic quick-release configured to separate the tether from the UAV in the event of an emergency.

10. The UAS of claim 1, wherein the nozzle is disposed at a distal end of the boom, and wherein the nozzle, boom, and flight control mechanisms are disposed such that the nozzle is located further from a center of the body than the flight control mechanisms.

11. An Unmanned Aerial System (UAS) for applying a liquid to a surface, the UAS comprising:
   an Unmanned Aerial Vehicle (UAV) including rotors, a body, a boom coupled to the body, a bumper disposed at a distal end of the boom, and a plurality of sensors disposed at the distal end of the boom, the plurality of sensors configured to detect, to the nearest centimeter, a position of the sensors relative to the surface, the UAV configured to receive first control signals and to adjust an operational configuration of the rotors in response to the first control signals;
   a liquid delivery assembly connected to the UAV, the liquid delivery assembly including a nozzle, the nozzle disposed at the distal end of the boom, the boom, rotors, and nozzle arranged such that the nozzle is disposed further away from the body than the rotors, the liquid delivery assembly configured to receive second control signals and to apply the liquid to the surface with the nozzle in response to the second control signals, and
   a control unit configured to transmit the first control signals and the second control signals to the UAV and the liquid delivery assembly, respectively, the control unit configured to calculate a position of the nozzle relative to the surface based at least upon the position of the sensors relative to the surface, the control unit configured to automatically adjust the operational configuration of the rotors in response to the calculated position of the nozzle relative to the surface such that the UAV travels along a predetermined flight path adjacent to the surface and the nozzle is maintained at an optimum distance from the surface as the UAV travels along the predetermined flight path, wherein the optimum distance is less than thirty centimeters, and wherein the bumper is arranged to protect the nozzle and the sensors if the bumper contacts the surface during travel of the UAV along the predetermined flight path.

12. The UAS of claim 11, wherein, the liquid delivery assembly further comprises:
   a supply reservoir, the supply reservoir configured to hold the liquid and remain on the ground while the UAV is in flight;
   a first pump coupled to the UAV, the first pump configured to supply the liquid to the nozzle;
   a tether comprising a flexible tube coupled between the supply reservoir and the first pump; and
   a second pump coupled to the supply reservoir and the flexible tube, the second pump configured to force the liquid from the supply reservoir, through the flexible tube, and to the first pump.

13. The UAS of claim 11, wherein the delivery assembly comprises:
   a cradle configured to hold an aerosol can, the aerosol can including a spring valve; and
   an actuator configured to depress the spring valve of the aerosol can in response to one of the second control signals.

14. An Unmanned Aerial Vehicle (UAV), comprising:
   a body;
   a rotor coupled to the body, an operational configuration of the rotor responsive to a first control signal;
   a boom coupled to the body;
   a nozzle coupled to a distal end of the boom, an operational configuration of the nozzle responsive to a second control signal, the rotor, boom, and nozzle arranged such that the nozzle is disposed further away from the body than the rotor;
   a bumper disposed at the distal end of the boom;
   a sensor disposed at the distal end of the boom, the sensor configured to generate a detection signal associated with a distance between the sensor and a surface disposed proximate to the sensor;
   a control unit configured to calculate a distance between the nozzle and the surface based at least upon the detection signal, the control unit configured to generate the first control signal based at least upon the distance between the nozzle and the surface to automatically adjust the operational configuration of the rotor such that the UAV travels along a predetermined flight path adjacent to the surface and the nozzle is maintained at an optimum distance from the surface as the UAV travels along the predetermined flight path, wherein the optimum distance is less than thirty centimeters, and wherein the bumper is arranged to protect the nozzle and the sensor if the bumper contacts the surface during travel of the UAV along the predetermined flight path.

* * * * *